J. F. KELLOGG.
GOLD SEPARATOR.
APPLICATION FILED MAR. 28, 1912.
1,070,695.
Patented Aug. 19, 1913.
2 SHEETS—SHEET 1.
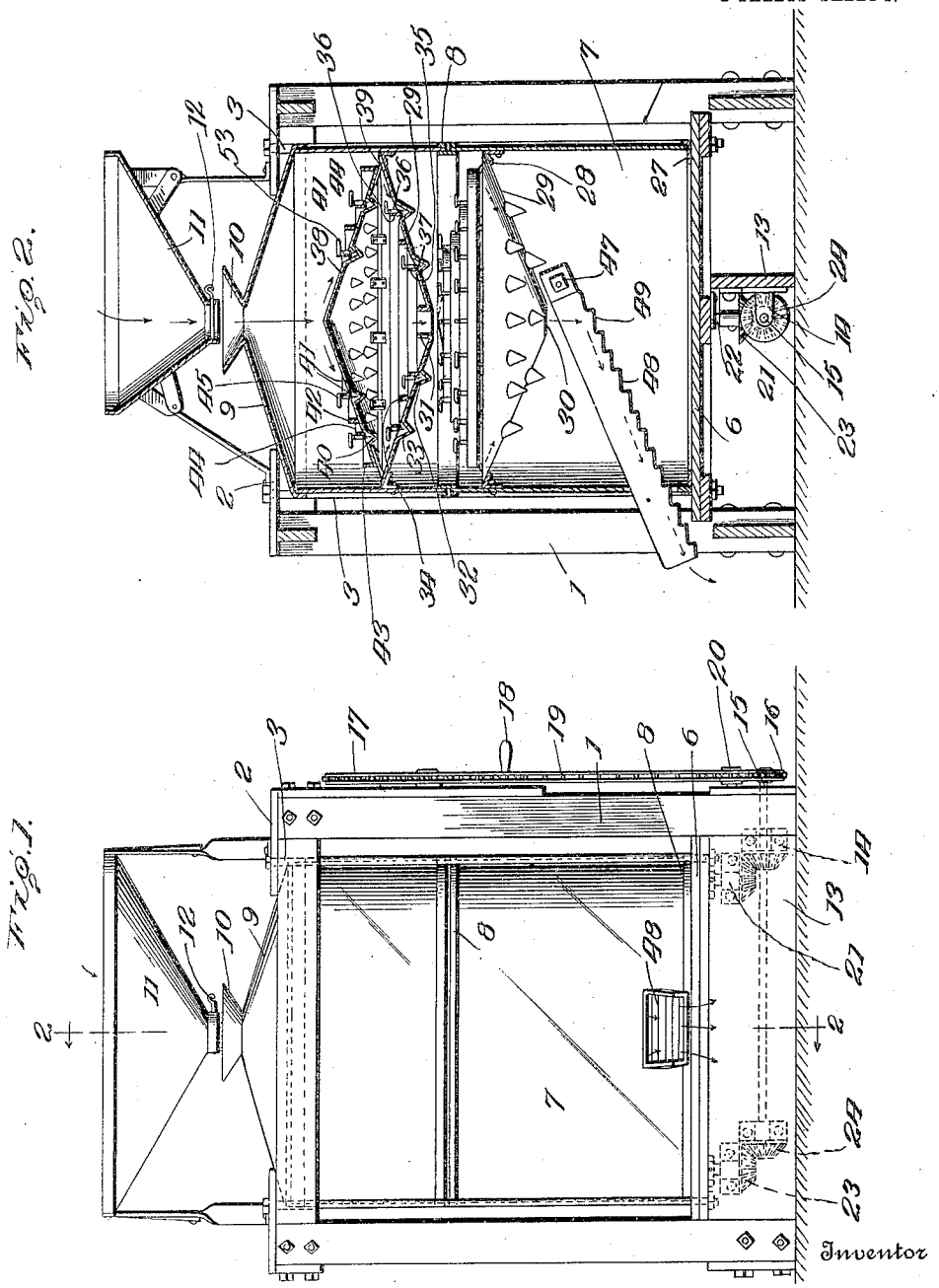
Witnesses
Inventor
J. F. Kellogg.
By
Attorneys.

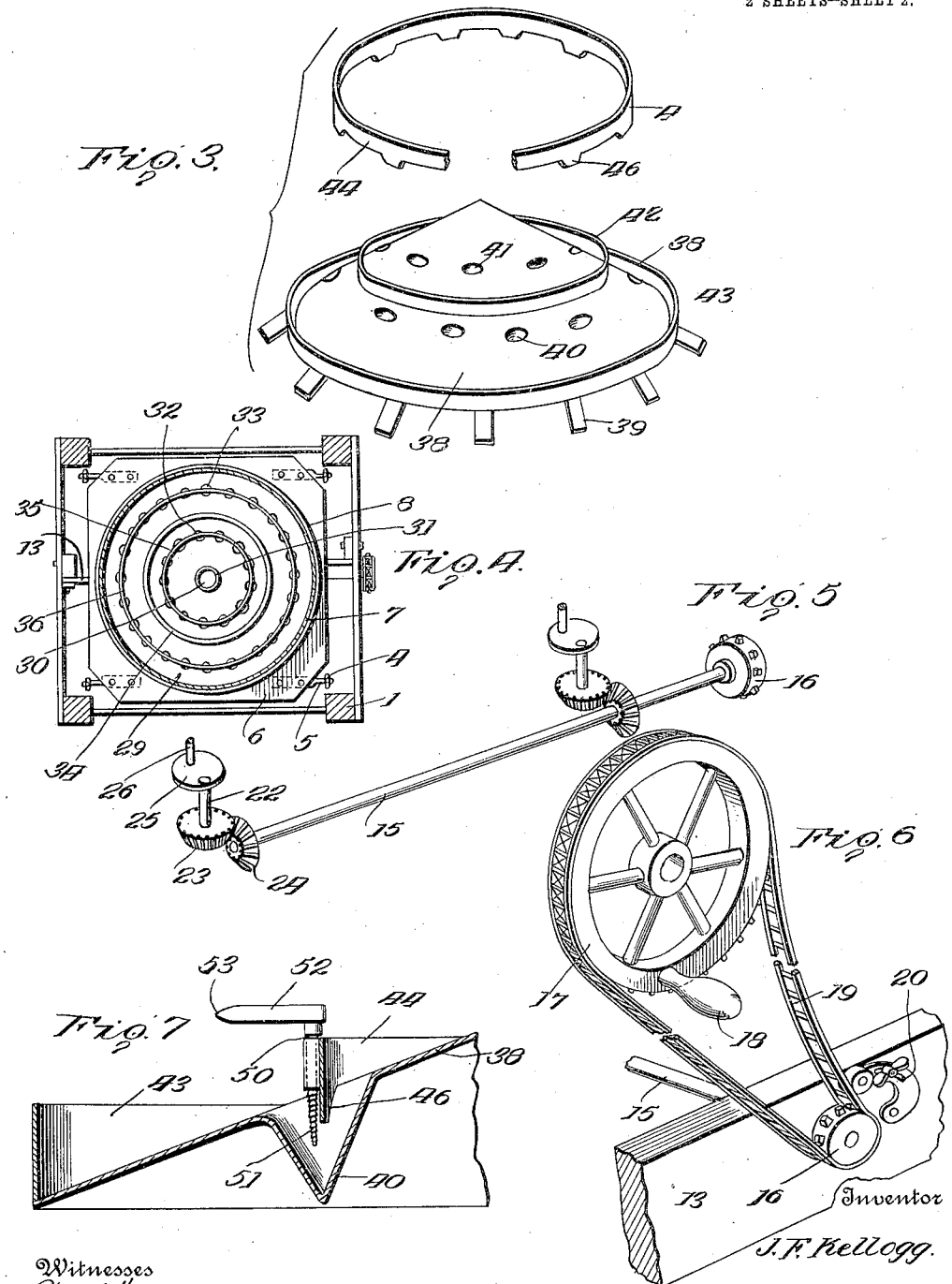

UNITED STATES PATENT OFFICE.

JOHN F. KELLOGG, OF GUTHRIE, OKLAHOMA.

GOLD-SEPARATOR.

1,070,695. Specification of Letters Patent. Patented Aug. 19, 1913.

Application filed March 28, 1912. Serial No. 686,909.

*To all whom it may concern:*

Be it known that I, JOHN F. KELLOGG, citizen of the United States, residing at Guthrie, in the county of Logan and State of Oklahoma, have invented certain new and useful Improvements in Gold-Separators, of which the following is a specification.

This invention has relation to gold separators, and has for its object to provide an apparatus of simple structural arrangement which may be economically used for speedily separating and recovering gold from dirt or gravel.

The parts of the apparatus are so arranged that the separation is effected without the use of water and at the same time practically all of the gold is recovered from the material that is passed through the apparatus.

While this machine is primarily intended for use in dry sections of the country, in case it is convenient, water may be used to good advantage by running a stream of dirt and water through the machine at the same time.

With the above object in view the apparatus includes a cylinder or body pendently supported in a frame and to which rotary reciprocatory movement is imparted through suitable means provided for this purpose. Convexed and concaved pans are arranged in pairs and located in the cylinder. These pans are provided with pockets adapted to receive the particles of gold, and ridges or riffles are disposed upon the pans in a manner to prevent the material from passing too rapidly over the pans and also to direct the material into the pockets where the gold is retained by reason of the fact that it is heavier than the other particles of material. The convexed pans are arranged to deliver the material from their edges upon the edge portions of the concaved pans and from the concaved pans the material is permitted to flow from openings provided at their centers upon the central portions of the convexed pans. Any number of sets of pans may be employed, and a chute is provided below the lowermost pan through which the tailings may pass out of the apparatus. A hopper is located upon the frame above the cylinder and is arranged to discharge the material into the cylinder through a hood which is mounted at the upper end of the cylinder.

A still further object of the invention is generally to improve this class of devices so as to increase their utility, durability and efficiency.

Further objects and advantages will appear from the following description, it being understood that various changes in form, proportions and minor details of construction may be resorted to within the scope of the appended claims.

In the accompanying drawings:—Figure 1 is a side elevation of the separator; Fig. 2 is a vertical sectional view of the same; Fig. 3 is a perspective view of one of the pans of the separator; Fig. 4 is a horizontal sectional view of the separator cut on the line 4—4 of Fig. 2; Fig. 5 is a perspective view of an operating shaft used in the separator; Fig. 6 is a perspective view of means for operating the separator; Fig. 7 is an enlarged detail sectional view of a portion of one of the pans of the separator.

Corresponding and like parts are referred to in the following description and indicated in all the views of the accompanying drawings by the same reference characters.

The apparatus includes a frame 1 which is preferably an open-work structure and which is provided at its upper end and at its corners with brackets 2. Rods 3 depend from the brackets 2 and are provided at their lower ends with eyes 4 which loosely receive pins 5. The pins 5 are attached to the corner portions of a platform 6 so that the said platform is supported at its four corner portions.

A cylinder 7 rests at its lower end upon the platform 6 and is made up of a series of sections which fit together at their ends. The sections of which the cylinder 7 is composed are provided with externally positioned reinforcing bands 8 and these bands are located in the vicinity of the ends of the cylinder sections, although if desired similar bands may be applied to the intermediate portions of the cylinder sections. A hood 9 rests upon the uppermost cylinder section and is provided at its center with a conical chute 10. A hopper 11 is supported upon the frame 1 above the hood 9 and has its discharge end located above the chute 10. The discharge outlet of the hopper 11 is provided with a gate or valve 12 which may be moved to increase or diminish the transverse sectional area of the discharge outlet of the hopper.

A cross beam 13 is located under the platform 6 and bearings 14 are mounted on the cross beam 13. A shaft 15 is journaled in the bearings 14 and is provided at one end with a sprocket wheel 16. A sprocket wheel 17 is journaled upon the frame 1 and is provided with a crank handle 18. A sprocket chain 19 is trained around the sprocket wheels 16 and 17 and is adapted to transmit rotary movement from the latter to the former. A slack absorbing device, indicated at 20, is mounted upon the frame 1 and bears against one of the runs of the chain 19 and is adapted to maintain the said chain at proper tension. Bearings 21 are also mounted upon the cross beam 13 and stub shafts 22 are journaled in the said bearings 21. Beveled pinions 23 are fixed to the lower ends of the shafts 22 and mesh with beveled pinions 24 mounted upon the shaft 15. Disks 25 are carried at the upper ends of the stub shafts 22 and crank pins 26 are eccentrically positioned upon the disks 25. These crank pins 26 are journaled in the platform 6 so that as the stub shafts 22 are rotated in a manner as the arrangement of the parts will indicate, the platform 6 and the parts mounted thereon will receive a rotary reciprocatory movement. However, the rods 3 which are connected with the brackets 2 and the pins 5 and which will swing in arcs during this movement will cause the said platform to have slight vertical reciprocatory movement at the time that it is moved horizontally. This is due to the fact that the rods 3 are held at their upper ends by the brackets 2 which are fixed, and consequently the lower ends of the rods 3 swing in arcs as the platform 16 is moved horizontally by the pins 26 carried by the disks 25. This combined movement is essential to effect the speedy passage of the material through the apparatus and to cause the gold to be readily separated from the tailings and to lodge in the pockets, as will be explained.

The cylinder 7 is restrained against lateral movement upon the platform 6 by means of blocks or a bead 27 which is fixed to the platform and which is received within the lower end of the lowermost section of the cylinder 7. In each section of the cylinder 7 is arranged a set of pans, and as the members and arrangement of all of the sets are alike, a description of one will suffice.

An angle iron 28 is attached to the inner side of each section and may extend completely around the same. A concaved pan 29 rests at its edge portion upon the angle iron 28 and is provided at its center with an opening 30 which is surrounded by an upstanding flange or riffle 31. Two sets of pockets 32 and 33 are concentrically arranged in the pan 29 between its outer edge and the opening 30. These pockets are conical in vertical section and their pointed ends are downwardly disposed. A flange or riffle 34 is positioned upon the upper side of the pan 29 between the sets of pockets 32 and 33. Flanges 35 and 36 are located over the sides of the pockets 32 and 33 respectively, and these flanges are provided with lips 37 which extend down into the upper ends of the pockets and terminate at levels below the level of the lowermost portions of the upper edges of the pockets.

A convexed pan 38 is supported above each of the concaved pans 29. The pan 38 is provided at its edges with feet 39 which rest upon the peripheral portion of the pan 29 so that the edge of the pan 38 is spaced from the edge portion of the pan 29. The pan 38 is provided between its center and its periphery with two sets of pockets 40 and 41. These pockets are the same in design and configuration as the pockets 32 and 33, hereinbefore described. A flange or riffle 42 is located upon the pan 38 between the sets of pockets 40 and 41 and a flange or riffle 43 is mounted upon the pan 38 beyond the outermost set of pockets 40 and in the vicinity of the periphery of the said pan. Flanges 44 and 45 are located upon the pan 38 above the sets of pockets 40 and 41 and are provided with lips 46 which enter the upper portions of the pockets 40 and 41 and are disposed similar to the disposition of the lips in the pockets 32 and 33, as above described.

A cross bar 47 is supported in the lowermost section of the cylinder 7 and the inner upper end of a chute 48 is attached to the said cross bar 47. The upper portion of the chute 48 lies under the opening 30 in the lowermost concaved pan 29 and the bottom of the chute 48 is stepped or ridged as at 49 so that the material deposited in the chute is retarded in its passageway through the same and may be readily inspected to see that during its passage out of the apparatus it contains none of the precious metal. The chute 48 being supported in the cylinder 7 as indicated will have the same movement as the cylinder.

Instead of using the sprocket wheel 17, chain 19 and sprocket wheel 16 for rotating the shaft 15, any other suitable means may be employed whereby the said shaft may be rotated manually or by the use of power.

In each of the pockets 32, 33, 40 and 41 a stirrer is arranged to operate, the function of this stirrer being to maintain the material in the pockets in a state of agitation so that the gold may settle in the lower portions of the pockets while the lighter material may pass out at the upper edges of the pockets. As these stirrers are all of the same pattern, a description of one will answer for all.

Each stirrer consists of a shaft 50 which is journaled in vertical position to the flange which crosses the pocket in which the lower portion of the stirrer is located. The shaft 50 at its lower end is roughened as at 51 and at its upper end is provided with a crank arm 52 which weights the shaft at one side of the axis. The shaft 50 is loosely journaled and consequently as the pans 29 and 38 describe the movement hereinbefore described, the arm 52 will cause the shaft 50 to swing or partially rotate and this will move the roughened portion 51 in the pocket and keep the material in the pocket in a state of agitation, as indicated.

The operation of the apparatus is as follows: The shaft 15 is rotated, whereby the peculiar movement hereinbefore described is transmitted through the intervening parts to the platform 6 and the parts mounted thereon. At the same time the mixed material is fed into the hopper 11 and is permitted to flow past the valve 12 at the discharge end thereof and through the chute 10 of the hood 9 upon the intermediate portion of the uppermost convexed pan 38. The material is spread at the upper portion of the pan by reason of the conical configuration of the pan and flows or rolls under the impetus of the movement of the pan toward the edges thereof. When the material comes in contact with the innermost flange 45 it is checked in its downward flow and some of the material passes down into the pockets 41. Some of the gold will deposit in these pockets and remain there. However, some of the material containing gold will pass down under the lower edges of the lips 46 and out at the lower edges of the upper ends of the pockets. This material will then come in contact with the riffle 42 and accumulate until it flows over the upper edge of the riffle. The material thus passing from the riffle 42 comes in contact with the flange 44 and some of it will enter the pockets 40, where some of the gold is retained. From the said pockets 40 the material flows against the riffle 43 and accumulates until it overflows the same, whence it falls from the edge of the pan 38 upon the edge portion of the pan 29. From the edge of the pan 29 the material will flow toward the center of the same in view of the fact that this pan is concaved. The material will first encounter the flange 36 and will pass down into the pockets 33 where some of the gold will lodge. From the pockets 33 the material passes to the riffle 34 and when sufficiently accumulated will flow over the same to the flange 35. The material then passes down into the pockets 32 where some of the gold will lodge and flows from the said pockets to the riffle 31. From the riffle 31 the material will flow over and out through the opening 30 and deposit upon the central portion of the convexed pan located immediately below. This operation is repeated throughout the series of pans and when the material arrives at the center of the lowermost pan it flows out through the central opening thereof upon the chute 48 along which it passes out of the apparatus. The material as it passes from the apparatus is free of the gold that it originally contained and said gold is retained in the pockets so that when the separation has ceased the hood 9 is removed from the uppermost section of the cylinder 7 and the said cylinder sections are lifted one off the other and removed from the frame 1. The pans 29 and 38 are then lifted out and the gold that has accumulated in their pockets is removed.

Therefore it will be seen that an apparatus is provided for effectually separating gold or other valuable matter, such as platinum from the material of little value and that the separation is effected without the use of water, although water may be employed if desired. This renders the device convenient and economical inasmuch as this separation many times must be accomplished at places where water is scarce and labor expensive.

Having thus described the invention, what is claimed as new is:

1. A separator comprising a pan having an inclined bottom with pockets provided therein, and a flange extending transversely across the pockets with its lower edge below the upper edge portions of the pockets, said flange having lips which extend into the pockets below the lower edge portions thereof.

2. A separator comprising a pan having an inclined bottom provided with pockets arranged in rows, flanges extending transversely across the pockets and projecting above the upper edges thereof, and a riffle mounted upon the pan between the rows of pockets.

3. A separator comprising a pan having a plurality of independent pockets formed in its bottom, means for shaking the pan and a plurality of independent stirrers rotatably mounted on the pan over the several pockets and depending into the same, the upper ends of the stirrers being provided with laterally extending weighted arms rigid therewith.

4. A separator comprising a pan having a plurality of independent pockets formed in its bottom, means for shaking the pan, and a plurality of independent stirrers loosely mounted on the pan above the several pockets and depending into the same, the lower ends of said stirrers being roughened and the upper ends thereof being provided with laterally extending weighted arms rigid therewith.

5. A separator comprising a cylinder, a vertical series of alternate concave and convex pans mounted within the cylinder, each of said pans being provided with spaced conical pockets in its bottom, means for imparting a horizontal rotary reciprocating motion to the cylinder, and a plurality of independent stirrers mounted upon each pan, each stirrer being located over and depending into a pocket and provided at its upper end with a laterally extending weighted arm whereby the stirrer will agitate the matter in the pocket as the cylinder is reciprocated.

In testimony whereof I affix my signature in presence of two witnesses.

JOHN F. KELLOGG. [L. S.]

Witnesses:
R. C. BURNSDALE,
N. C. ORR.

Copies of this patent may be obtained for five cents each, by addressing the "Commissioner of Patents, Washington, D. C."